United States Patent [19]

Connelly et al.

[11] 3,998,777

[45] Dec. 21, 1976

[54] METHOD OF HYDROLYZING POLYACRYLAMIDE

[75] Inventors: Lawrence J. Connelly, Oak Lawn; E. G. Ballweber, Glenwood, both of Ill.

[73] Assignee: Nalco Chemical Company, Oak Brook, Ill.

[22] Filed: Oct. 15, 1974

[21] Appl. No.: 514,961

[52] U.S. Cl. .................. 260/29.6 E; 260/29.6 H; 260/29.6 N; 260/29.6 AT; 260/29.6 HN

[51] Int. Cl.² ................................. C08L 33/26

[58] Field of Search ............ 260/29.6 H, 29.6 N, 260/29.6 E, 29.6 AT, 29.6 HN

[56] References Cited

UNITED STATES PATENTS

| | | | |
|---|---|---|---|
| 2,892,825 | 6/1959 | Boettner | 260/89.5 |
| 3,284,393 | 11/1966 | Vanderhoff | 260/29.6 HN |
| 3,412,060 | 11/1968 | Sarem | 260/29.6 H |
| 3,624,019 | 11/1971 | Anderson | 260/29.6 HN |
| 3,637,564 | 1/1972 | Economou | 260/29.6 N |
| 3,784,597 | 1/1974 | Fujimoto | 260/80.3 N |

*Primary Examiner*—Paul R. Michl
*Attorney, Agent, or Firm*—John G. Premo; Robert A. Miller; Barry W. Sufrin

[57] ABSTRACT

Polyacrylamide dispersed in a polymeric latex may be hydrolyzed by the use of an alkali stable organic surfactant followed by the reaction of the polyacrylamide with an alkali metal hydroxide or quaternary ammonium hydroxide.

16 Claims, No Drawings

3,998,777

METHOD OF HYDROLYZING POLYACRYLAMIDE

INTRODUCTION

This invention concerns a method of hydrolyzing polyacrylamide to provide a polymer which has been found to be useful in thickening and flocculation applications. In particular, aqueous solutions of the hydrolyzed polyacrylamide of this invention have been found to provide excellent results in the thickening and dewatering of industrial wastes, sewage wastes, and clarifications of turbid aqueous solutions. In addition the hydrolyzed polyacrylamide is used in secondary and tertiary oil recovery processes to help increase the amount of crude oil recovered from underground oil-bearing formations. The use of the polymer in this oil recovery process is becoming quite widespread in view of the current need to meet our crude oil requirements.

Typically these polymers are available as powders or as finely divided solids, which are dissolved in water to form aqueous solutions for use in the desired application. Great difficulty has been experienced in dissolving the dry polymers, particularly hydrolyzed polyacrylamide due to its slow dissolution time and because the dry polymer is not readily dispersable in water. The dry polymer has a tendency to form lumps when placed in contact with water. These lumps often take quite a long period of time to dissolve, sometimes as long as 6–10 hours.

U.S. Pat. No. 3,624,019, Anderson et al, discloses a polymeric latex comprising a water-in-oil emulsion which contains dispersed therein finely divided particles of a water-soluble vinyl addition polymer. A preferred polymer disclosed therein is polyacrylamide. The emulsions containing polymer described therein are stable and when inverted in the presence of water, the polymer goes into solution in a very short period of time as compared to the dissolution of a dry solid polymer. A water-in-oil polymerization process and method for making latex polymers is disclosed in Vanderhoff et al, U.S. Pat. No. 3,284,393.

It would be desirable to provide a hydrolyzed polyacrylamide polymer in the form of the polymeric latex described above. However, up to this time it has not been possible to hydrolyze a polymeric latex of polyacrylamide. During the hydrolysis reaction the polymeric latex becomes unstable and the polymer present in the polymeric latex coagulates and precipitates out of the water-in-oil emulsion thereby producing a commercially useless product.

This invention provides a method of hydrolyzing polyacrylamide which is present in the form of a polymeric latex by the addition of an organic stabilizer or alkali stable organic surfactant to the polymeric latex prior to the hydrolysis. By the addition of the organic stabilizer, it is therefore possible to perform the hydrolysis to provide a polymeric latex of hydrolyzed polyacrylamide which is stable.

OBJECTS

It is therefore an object of this invention to provide a method of hydrolyzing polyacrylamide.

It is also an object of this invention to provide a method of hydrolyzing polyacrylamide, which is in the form of a polymeric latex.

Another object of this invention is to provide a stable polymeric latex of hydrolyzed polyacrylamide by the addition of an alkali stable organic surfactant prior to the hydrolysis.

A further object is to provide an alkali stable organic surfactant for use in hydrolyzing polyacrylamide.

A still further object is to provide a stable polymeric latex of hydrolyzed polyacrylamide for use in secondary and tertiary oil recovery, clarification of turbid aqueous solutions and for thickening and dewatering of industrial and sewage wastes.

Other objects will appear hereinafter.

This invention provides a method of hydrolyzing polyacrylamide comprising the steps of:

A. Forming a polymeric latex comprising a water-in-oil emulsion which contains dispersed therein finely divided polyacrylamide;

B. Adding to the polymeric latex an alkali stable organic sufactant capable of forming a water-in-oil emulsion; and C. Reacting the polymeric latex containing the organic stabilizer with an alkali metal hydroxide or quaternary ammonium hydroxide to form a hydrolyzed polyacrylamide.

THE POLYMERIC LATEX

A polymeric latex is formed which comprises a water-in-oil emulsion containing dispersed therein finely divided polyacrylamide. These polymeric lattices and their method of production are described in U.S. Pat. Nos. 3,284,393 and 3,624,019. These Patents are incorporated herein by reference.

The molecular weight of the polyacrylamide may vary over a wide range, i.e. 10,000–25,000,000. The invention, however, finds its greatest usefulness when the molecular weight of the polyacrylamide is in excess of 1 million.

The oils used in preparing the polymeric latex may be selected from a large group of organic liquids which include liquid hydrocarbons and substituted liquid hydrocarbons. A preferred group of organic liquids are the hydrocarbon liquids which include both aromatic and aliphatic compounds such as benzene, xylene, toluene, mineral oils, kerosenes, and naphthas. A particularly useful oil from the standpoint of its physical and chemical properties is the branch-chain isoparaffinic solvent sold by Humble Oil and Refining Company under the trade name ISOPAR M. Typical specifications of this narrow-cut isoparaffinic solvent are set forth below in Table I.

TABLE I

| Specification Properties | Minimum | Maximum | Test Method |
|---|---|---|---|
| Gravity, API at 60/60° F | 48.0 | 51.0 | ASTM D 287 |
| Color, Saybolt | 30 | | ASTM D 156 |
| Aniline Point, ° F | 185 | | ASTM D 611 |
| Sulfur, ppm | | 10 | ASTM D 1266[1] |
| Distillation, ° F | | | ASTM D 86 |
| IBP | 400 | 410 | |
| Dry Point | | 495 | |
| Flash Point, ° F, (Pensky-Martens closed cup). | 160 | | ASTM D 93 |

[1] Nephelometric mod.

The amounts of the components in the polymeric latex may vary over a wide range. However, generally the polymeric latex is composed of 20–50 % by weight of water, 10–40% by weight of oil and 20–40% by weight of polyacrylamide. It is generally necessary to employ an oil soluble emulsifying agent in order to maintain a stable emulsion. The amount of emulsifying agent needed to provide an emulsion will have to be determined by routine experimentation. As a general rule it may be said that the amount of oil-soluble emulsifier may range from 0.1 to 30% by weight based on the weight of oil. To produce stable emulsions the amount of emulsifier will normally be within the range of 3–15% by weight of the oil. The preferred emulsifiers are the so-called low HLB materials which are well documented in the literature and are summarized in the Atlas HLB Surfactant Selector. Although these emulsifiers are useful in producing good water-in-oil emulsions, other surfactants may be used as long as they are capable of producig these emulsions. For instance, certain high HLB surfactants are capable of producing stable water-in-oil emulsions. A typical low HLB emulsifier is sorbitan monooleate. Other emulsifiers are discussed in U.S. Pat. No. 3,284,393.

The emulsions may be prepared by any one of a number of methods. One particular method is that taught in U.S. Pat. No. 3,284,393. In addition, the emulsions may be prepared by using high-speed agitation or ultrasonic techniques.

THE ALKALI STABLE ORGANIC SURFACTANT

The organic surfactants used in this invention must be alkali stable and capable of forming a water-in-oil emulsion. Any compound meeting these requirements may be used, however due to variations in the polymeric latex, and hydrolysis agents, each organic stabilizer should be tried first on a small sample and be used on a case by case basis.

The organic stabilizer typically used is formed by the reaction of an aliphatic hydrocarbon alcohol having from 10–20 carbon atoms with from 2–10 moles of ethylene oxide per mole of the alcohol. Preferably the alcohol will have from 12–18 carbon atoms and will be reacted with 2–4 moles of ethylene oxide per mole of the alcohol.

A preferred organic surfactant is formed by the reaction of 1 mole of oleyl alcohol with two moles of ethylene oxide to form polyoxyethylene (2) oleyl alcohol. Another preferred organic stabilizer is formed by the reaction of one mole of lauryl alcohol with four moles of ethylene oxide to form polyoxyethylene (4) lauryl ether. These compounds are well known and their preparations are commonly known to those skilled in the art.

In the preferred embodiment of this invention, the organic surfactant is added to the polymeric latex and thoroughly mixed in a concentration of from 0.10 to 15.0% by weight based on the polymeric latex. The preferred concentration is from 0.5 to 3.0% by weight.

Another embodiment of this invention involves the forming of the polymeric latex which comprises a water-in-oil emulsion which contains dispersed therein finely divided polyacrylamide and the organic stabilizer formed by the reaction of an aliphatic hydrocarbon alcohol having from 10–20 carbon atoms with from 2–10 moles of ethylene oxide per mole of the alcohol. This polymeric latex is then reacted with a hydrolysis agent to form a hydrolyzed polyacrylamide. The advantage of this embodiment of the invention is that there is one less step in the method. The organic stabilizer being already present in the polymeric latex.

THE HYDROLYSIS

The polymeric latex containing the organic stabilizer is reacted with a hydrolysis agent. The hydrolysis agents may be alkali metal hydroxides or quaternary ammonium hydroxides. Typically, alkali metal hydroxides include lithium, sodium and potassium hydroxides. A typical quaternary ammonium hydroxide is tetra methyl ammonium hydroxide.

In the practice of the invention the hydrolysis agent used should be added to the polymeric latex as an aqueous solution slowly and with mixing. The preferred hydrolysis agents used in the invention are alkali metal hydroxides and more specifically sodium, potassium, and lithium hydroxides with the most preferred being about a 50% aqueous solution of the alkali metal hydroxide. The concentration of the solution of the alkali metal hydroxide is within the range of 0.2–30% by weight based on the polymeric latex and preferably 4–12% by weight based on the polymeric latex. However, the percentage of hydrolysis agent used will always vary to the degrees of hydrolysis desired with higher percentage of the hydrolysis agent being used for higher degrees of hydrolysis.

While solutions of about 50% concentration of the Alkali metal hydroxides are convenient to use, it is important to note that higher or lower concentrations of alkali metal hydroxides in aqueous media may be used. Conditions favoring lower concentrations of the hydrolysis agent include the desire for low levels of hydrolysis and stability factors. Conditions favoring higher concentrations include the desire for a high degree of hydrolysis without excessive dilution, and for stability reasons.

The hydrolysis may be conducted at room temperature but more favorable results are obtained at elevated temperatures. Generally the reaction maybe performed within the range of from 10°–70° C. The preferred temperature range is from 35°–55° C. The length of time for hydrolysis depends upon the reactants, their concentration, reaction conditions and the degree of hydrolysis desired. It has been experimentally determined that polyacrylamide may be hydrolyzed according to the procedure set forth herein to a degree of between 5–80%. Depending upon the reaction conditions described above, typically a 20–60% hydrolysis is obtained, with the preferred range being 30–50%. This hydrolysis procedure and all of the reaction conditions and ranges described herein apply to both embodiments of this invention: that is, (1) the formation of the polymeric latex with the alkali stable organic surfactant and (2) the addition of the alkali stable organic surfactant to a polymeric latex. With the use of the organic surfactant, it is possible to hydrolyze the polymeric latex of polyacrylamide.

The hydrolyzed polyacrylamide is dispersed throughout the water-in-oil emulsion, similar to those emulsions disclosed in Anderson et al, U.S. Pat. No. 3,624,019. This polymer latex may be inverted in a similar manner to that disclosed in Anderson et al. The polymer latex releases the hydrolyzed polyacrylamide in water in a very short period of time. Generally, a surfactant is added to either the polymer-containing emulsion or to the water into which it is to be dissolved. The placement of a surfactant into the water causes the emulsion to rapidly invert and release the polymer in the form of an aqueous solution. The surfactants listed in Anderson et al have been found to easily invert the hydrolyzed polyacrylamide, however, due to variations in the polymeric latices surfactants used for inversion should be tried on a case by case basis. The invention can be more readily understood by the following examples.

EXAMPLE 1

A polyacrylamide latex was prepared for hydrolysis studies.

A two liter three-neck reaction vessel was charged with 340 g. of an iosparaffinic solvent previously described as ISOPAR M, and having an average molecular weight of 175–180, and 20 g. of sorbitan monooleate as an emulsifier. To this was added 40 g. of acrylamide, 180 g. of water, 0.4 ml. of 2% EDTA (ethylene diamine tetraacetic acid) and a drop of 50% sodium hydroxide. Over a 30 minute period of time, the temperature was raised to 30° C. and then to 45° C. within 10 minutes as 10 mls. of 8% vazo catalyst is added. Vazo catalyst is a well-known catalyst and is 2,2'azobis (isobutronitrile). The amount of catalyst is 0.2% by weight based on the monomer. After 30 minutes, 200 mls. of a monomer solution is added. The monomer solution contains the following:

Acrylamide 360 g.
Water 250 g.
Boric Acid 7.2 g.
EDTA 3.6 ml.
50% sodium hydroxide 0.5 g.

The temperature is kept between 43°–48° C. for 1½ hours. Then 200 mls. of the monomer solution is again added. The temperature is kept between 44°–50° C. for 1½ hours, after which a third addition of 200 mls. of the monomer solution is added. After about 2 hours, the reaction is stopped and a good latex recovered without particles.

The molecular weight was over 5,000,000 and the intrinsic viscosity was over 10.0.

EXAMPLE 2

One hundred fifty grams of the latex of Example 1 was charged to a 500 ml. reaction flask. To this was added 2.52 g. of polyoxyethylene (2) oleyl ether and stirred about 400 r.p.m. at room temperature for 25 minutes. Then, at 26° C., 16.95 g. of 50% sodium hydroxide was added over a 5 minute period. The temperature increased to 32.5° C. The reaction mixture was stirred at about 400 r.p.m. After 1 hour, sample Number 1 was taken. An hour later sample Number 2 was taken. Eighteen hours later, sample Number 3 was removed.

The samples were worked-up in the following way: A sample of the latex as diluted with 100 ml. of ISOPAR M solvent having an average molecular weight of 175 to 180. This was then added to 1 liter of a mixed solvent containing 50% each by volume of acetone and methanol, filtered and dried 16 hours under vacuum at 40° C.

The following table II shows the amount of latex in each samples, dried weight, the percent acrylate and amide in the product as measured by infra-red analysis and the viscosity at a concentration of 1.0% in deionized water.

TABLE II

| Sample No. | Grams Latex | Dried Weight | % Acrylate | % Amide | Viscosity (cps) |
|---|---|---|---|---|---|
| 1 | 22.68 g. | 7.93 g. | 16 | 84 | 10,000 |
| 2 | 21.80 | 7.80 | 26 | 74 | 26,000 |
| 3 | 23.40 | 8.80 | 40 | 60 | 25,500 |

This example shows the effect of time on the hydrolysis.

EXAMPLE 3

This example was run the same as Example 2 except a higher temperature was used, namely 45° to 50° C.

Samples were taken at 1 hour, 2 hours, and after about 20 hours. The following Table III shows the results of the respective samples. The same work-up was used as in Example 2.

TABLE III

| Sample No. | Weight Latex | Dried Weight | % Acrylate | % Amide | Viscosity (cps) |
|---|---|---|---|---|---|
| 1 | 26.42 g. | 10.2 g. | 36 | 64 | 26,500 |
| 2 | 24.50 g. | 9.71 g. | 37 | 63 | 16,500 |
| 3 | 24.60 g. | 9.70 g. | 39 | 61 | 28,000 |

EXAMPLE 4

This example uses a different alkali stable organic surfactant. A 500 ml. three necked-distillation flask is equipped with a stirrer, thermometer, sampling tube, reflux condenser, and a hot water bath. One hundred fifty grams of the latex of Example 1 is charged to the reaction flask. Then, 2.53 g. of polyoxyethylene (4) lauryl ether is added to the latex at 42°–45° C. After stirring for about 10 minutes at 400 r.p.m., 17.15 g. of 50% sodium hydroxide is added dropwise. A moderate viscosity increase is noted. The reaction is held at 42°–45° C for 1 hour. A molderate darkening is observed. Sample 1 is removed. After another hour, sample 2 is removed. The same work-up is used as in Example 2.

TABLE IV

| Sample No. | Weight Latex | Dried Weight | % Acrylate | % Amide | Viscosity (cps) |
|---|---|---|---|---|---|
| 1 | 21.6 | 8.9 | 40 | 60 | 26,000 |
| 2 | 21.5 | 8.0 | 40 | 60 | 26,000 |

EXAMPLE 5

Another latex was prepared using a greater amount of emulsifier and alkali stable organic surfactant. A latex was prepared in the same way as Example 1 except that instead of 20 g. of sorbitan monooleate, 60 g. (15% by weight) of polyoxyethylene (2) oleyl ether was used.

EXAMPLE 6

After the polymerization of Example 5 was completed, 50 g. of the latex was placed in a reaction vessel. Then, 3.36 g. (20% by weight) of the sodium salt of alkyl acryl polyether sulfonate was added as an emulsifier. This emulsifier is sold under tradename of Triton X-200. Thus, the total amount of emulsifier and stabilizer is 35% by weight based on the polymer. Then, 2.72 g. of 50% sodium hydroxide (10 mole percentage based on polyacrylamide) was added and hydrolysis proceeded as in Example 2. The polymer as measured by titration showed 12% acrylate.

EXAMPLE 7

This example was run in the same way as Example 6 except the amount of 50% sodium hydroxide was 0.91 g. (5 mole percentage based on polyacrylamide). The result was that the polymer as measured by titration showed 6% acrylate.

As is readily apparent to anyone skilled in the art, the examples demonstrate a useful method for the hydrolysis of polyacrylamide, and produce a stable product readily inverted into aqueous solution.

What is claimed is:

1. A method of hydrolyzing polyacrylamide which comprises the steps of:
    A. forming a polymeric latex comprising a water-in-oil emulsion which contains dispersed therein finely divided polyacrylamide, said water-in-oil emulsion of polyacrylamide containing from 10 to 40% by weight of oil, 20 to 50% by weight of water, 20 to 40% by weight of polyacrylamide and 0.1 to 30% by weight of a water-in-oil emulsifying agent based on the weight of oil;
    B. adding to said polymeric latex from 0.10 to 15% by weight based on the polymeric latex of an alkali stable organic surfactant capable of forming a water-in-oil emulsion; and
    C. reacting said polymeric latex containing the organic stabilizer with an hydrolysis agent selected from the group consisting of alkali metal hydroxides and quaternary ammonium hydroxides, to form a stable water-in-oil emulsion of finely divided hydrolyzed polyacrylamide.

2. The method of claim 1 wherein said alkali stable organic surfactant is added in the range of from 0.5 to 3.0% by weight based on the polymeric latex.

3. The method of claim 1 wherein said alkali stable organic surfactant is formed by the reaction of an aliphatic hydrocarbon alcohol having from 10 to 20 carbon atoms with from 2 to 10 moles of ethylene oxide per mole of said alcohol.

4. The method of claim 1 wherein said alkali stable organic surfactant is polyoxyethylene (2) oleyl ether formed by the reaction of one mole of oleyl alcohol with 2 moles of ethylene oxide.

5. The method of claim 1 wherein said alkali stable organic surfactant is polyoxyethylene (4) lauryl ether formed by the reaction of one mole of lauryl alcohol with 4 moles of ethylene oxide.

6. The method of claim 1 wherein the quaternary ammonium hydroxide is tetramethyl ammonium hydroxide.

7. The method of claim 1 wherein said alkali metal hydroxide is an aqueous solution of sodium hydroxide of about 50 weight percent.

8. The method of claim 1 wherein said alkali metal hydroxides are from the group consisting of sodium hydroxide, potassium hydroxide and lithium hydroxide.

9. The method of claim 1 wherein the reaction of Step C is performed at from 10° to 80° C.

10. The method of claim 1 wherein the reaction of Step C is performed at from 35° to 55° C.

11. The method of claim 1 wherein said alkali metal hydroxide is an aqueous solution of about 50% concentration by weight and said solution ranges from 0.2 to 30% by weight based on the polymeric latex.

12. The method of claim 1 wherein said alkali metal hydroxide is in aqueous solution of about 50% concentration by weight and said solution ranges from 4 to 12% by weight based on the polymeric latex.

13. The method of claim 1 wherein said polyacrylamide is hydrolyzed to from 5 to 80% by weight.

14. The method of claim 1 wherein said polyacrylamide is hydrolyzed to from 20 to 60% by weight.

15. The method of claim 1 wherein said polyacrylamide is hydrolyzed to from 30 to 50% by weight.

16. The method of claim 11 wherein the quaternary ammonium hydroxide is tetramethyl ammonium hydroxide.

* * * * *